(12) United States Patent
Wilkins

(10) Patent No.: US 11,815,131 B2
(45) Date of Patent: Nov. 14, 2023

(54) SEAL ASSEMBLY WITH A LOAD BEARING RING

(71) Applicant: AKTIEBOLAGET SKF, Gothenburg (SE)

(72) Inventor: John Arthur Wilkins, Chicago, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/693,653

(22) Filed: Mar. 14, 2022

(65) Prior Publication Data

US 2023/0287935 A1  Sep. 14, 2023

(51) Int. Cl.
*F16C 33/58* (2006.01)
*F16C 33/78* (2006.01)

(52) U.S. Cl.
CPC ........ *F16C 33/7823* (2013.01); *F16C 33/586* (2013.01); *F16C 33/783* (2013.01); *F16C 2208/10* (2013.01); *F16C 2361/31* (2013.01)

(58) Field of Classification Search
CPC .. F16C 33/586; F16C 33/723; F16C 33/7823; F16C 33/7826; F16C 33/783; F16C 33/7886; F16C 35/077; F16C 2208/10; F16C 2326/02; F16C 2361/31; F16J 15/32; F16J 15/3208; F16J 15/3232
See application file for complete search history.

(56) References Cited

U.S. PATENT DOCUMENTS

| | | | | |
|---|---|---|---|---|
| 2,676,040 A | * | 4/1954 | Dalton | F16J 15/3232 277/565 |
| 3,614,183 A | * | 10/1971 | Berens | F16C 33/7886 277/565 |
| 4,815,191 A | * | 3/1989 | Garman | F16C 33/7886 403/162 |
| 2019/0113080 A1 | * | 4/2019 | Kamiya | F16J 15/447 |

FOREIGN PATENT DOCUMENTS

| | | | | |
|---|---|---|---|---|
| GB | 2170266 A | * | 7/1986 | ............ E02F 9/006 |
| JP | 2007177863 A | * | 7/2007 | ............ F16C 19/388 |
| WO | WO-2015072352 A1 | * | 5/2015 | ............ F16C 19/385 |

OTHER PUBLICATIONS

WO2015072352_A1_translation.*

* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

A seal assembly is for sealing a space adjacent to a bearing and defined between an inner member and an outer member disposed about the inner member. The seal assembly includes an annular seal disposed about the inner member and having a sealing lip sealingly engageable with the inner member. An annular load ring is disposed within the outer member bore and has an inner circumferential surface defining a bore, the seal being disposed within the bore and coupled with the ring. A first axial end of the ring is disposed against the bearing outer ring, or a spacer disposed axially between the load ring and the bearing outer ring, and a (Continued)

second axial end is disposed against a radial surface of the outer member. The load ring is configured to support axial loading on, and to prevent axial displacement of, the bearing outer ring.

20 Claims, 6 Drawing Sheets

SEAL ASSEMBLY WITH A LOAD BEARING RING

BACKGROUND OF THE INVENTION

The present invention relates to seals, and more particularly to seal assemblies for bearings.

Seals for sealing the space adjacent to a bearing, either to retain lubricant within the bearing or to prevent contaminants from entering the bearing, are well known. A typical seal construction includes a rigid annular case, commonly formed of steel or aluminum, and an elastomeric sealing member molded to the annular case. In certain applications, the seal is required to axially retain the bearing outer ring within the bore of a housing or other outer member (e.g., a rotatable outer hub).

With such applications, the seal must have a sufficient rigidity to absorb and transfer axially loading on the bearing outer ring to the housing/outer member. To provide sufficient rigidity, the seal case must have a certain material thickness and cannot have elastomeric material on the axial sides of the case which contact the bearing or the outer member as such material is compressible and would permit movement of the bearing outer ring. The process of molding the elastomeric sealing member to the case usually requires some elastomeric material to be formed on the axial sides of the case, so that the material may flow to radially inner portions of the case. As such, the elastomeric material must be machined off of the case axial sides, which may lead to elastomeric debris being adhered to the seal and require an additional cleaning step during manufacturing of the seal.

SUMMARY OF THE INVENTION

In one aspect, the present invention is a seal assembly for sealing a space adjacent to a bearing and defined between an inner member and an outer member disposed about the inner member, either the inner member or the outer member being rotatable about a central axis. The outer member has an inner circumferential surface defining a bore and the bearing has an inner ring coupled with the inner member and an outer ring coupled with the outer member. The seal assembly comprises an annular seal disposed about the inner member and having a sealing lip sealingly engageable with the inner member. An annular load ring is disposed within the bore of the outer member and has an outer circumferential surface, an inner circumferential surface defining a bore, the seal being disposed within the bore of the load ring so as to be coupled with the load ring. A first axial end of the load ring is disposed against the bearing outer ring, or a spacer disposed axially between the load ring and the bearing outer ring, and a second axial end of the load ring is disposed against a radial surface of the outer member. The load ring is configured to support axial loading on the bearing outer ring and to prevent axial displacement of the bearing outer ring.

In another aspect, the present invention is a mechanical assembly including the outer member (preferably a static housing), the inner member (preferably a rotatable shaft), the bearing and the seal assembly as described in the preceding paragraph.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
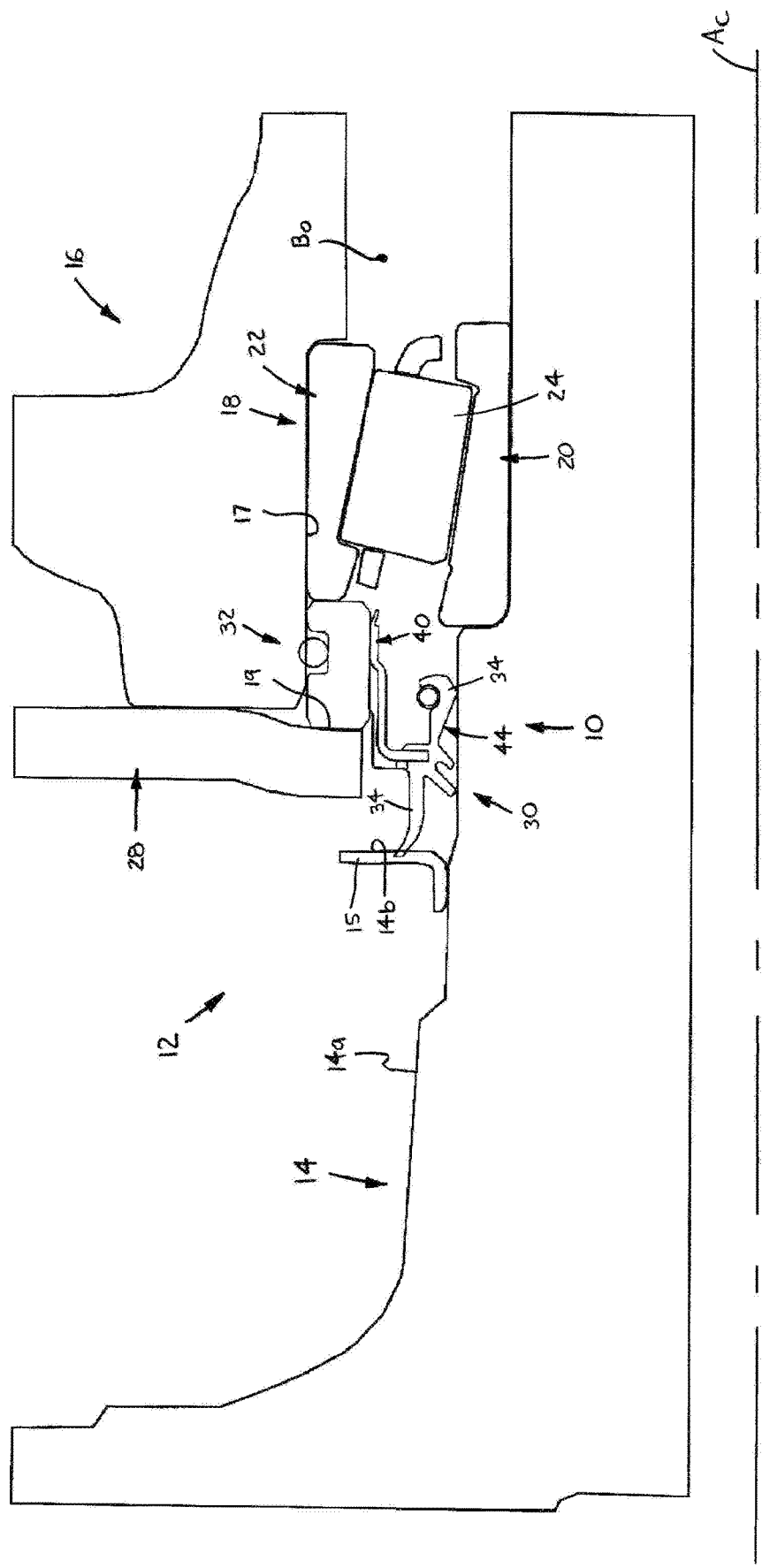
FIG. 1 is an axial cross-sectional view of a mechanical assembly including a seal assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a seal assembly 10 for a mechanical assembly 12, the mechanical assembly 12 including an inner member 14, an outer member 16 disposed about the inner member 14 and a bearing 18 rotatably coupling the inner and outer members 14, 16, respectively. The outer member 16 has an inner circumferential surface 17 defining a bore $B_O$ and the bearing 18 has an inner ring 20 coupled with the inner member 14, an outer ring 22 coupled with the outer member 16, and a plurality of rolling elements 24 disposed between the inner and outer rings 14, 16. Preferably, the mechanical assembly 12 is a rear drive axle assembly for a vehicle, the inner member 14 is a shaft rotatable about a central axis Ac extending through the shaft, and the outer member 16 is a fixed or static housing containing the shaft. However, the mechanical assembly 12 may be any other type of assembly which includes an inner member 14 and an outer member 16, one of which is rotatable about a central axis Ac, and a bearing 18, such as for example, an outer hub rotatable about an inner static axle, an inner pump shaft rotatable within a fixed pump housing, etc. In any case, the seal assembly 10 basically comprises an annular seal 30 disposed about the inner member 14 and an annular load bearing/supporting or "load" ring 32 disposed within the bore $B_O$ of the outer member 16, the seal 30 being disposed within the load ring 32.

More specifically, the seal 30 has at least one and preferably a plurality of sealing lips 34 sealingly engageable with the inner member 12. Preferably, the seal 30 includes a rigid annular case 40 and an annular elastomeric sealing member 42 molded to the rigid case 40 and providing the sealing lip(s) 34, as described in further detail below. Further, the load ring 32 has an outer circumferential surface 33A, an inner circumferential surface 33B defining a bore BL, a first axial end 32a, and an opposing second axial end 32b. The seal 30 is disposed within the bore BL of the load ring 32 so as to be coupled with the ring 32, preferably by frictional engagement of an outer axial section 44 of the case 40 disposed against the inner circumferential surface 33B of the load ring 32, as discussed below.

Furthermore, when installed within the mechanical assembly 12, the first axial end 32a of the load ring 32 is disposed against the bearing outer ring 22, or alternatively against a spacer 26 (FIG. 3) disposed axially between the load ring 32 and the bearing outer ring 22, and the second axial end 32b is disposed against a radial surface 19 of the outer member 16. Preferably, the outer member 16 includes a removable cover plate 28, which can be demounted from the remainder of the outer member 16 to enable installation and removal of the bearing outer ring 22 and the seal assembly 10 within the housing bore $B_O$. The cover plate 28 provides the outer member radial surface 19, but the outer member 16 may alternatively include a spacer ring (not shown) or another member providing the radial surface 19. With the load ring 32 so positioned within the mechanical assembly 12, the load ring 32 is configured to support axial loading on the bearing outer ring 22 and also to prevent axial displacement of the bearing outer ring 22; i.e., the load ring 32 retains or fixes the bearing outer ring 22 within the outer member bore $B_O$. With the preferred cover plate 28, the load ring 32 is clamped between the plate 28 and the bearing outer ring 22 such that the load ring 32 is configured to transfer axial loading LA on the bearing outer ring 22 to the cover plate 28, as indicated in FIG. 2.

Figure 4:
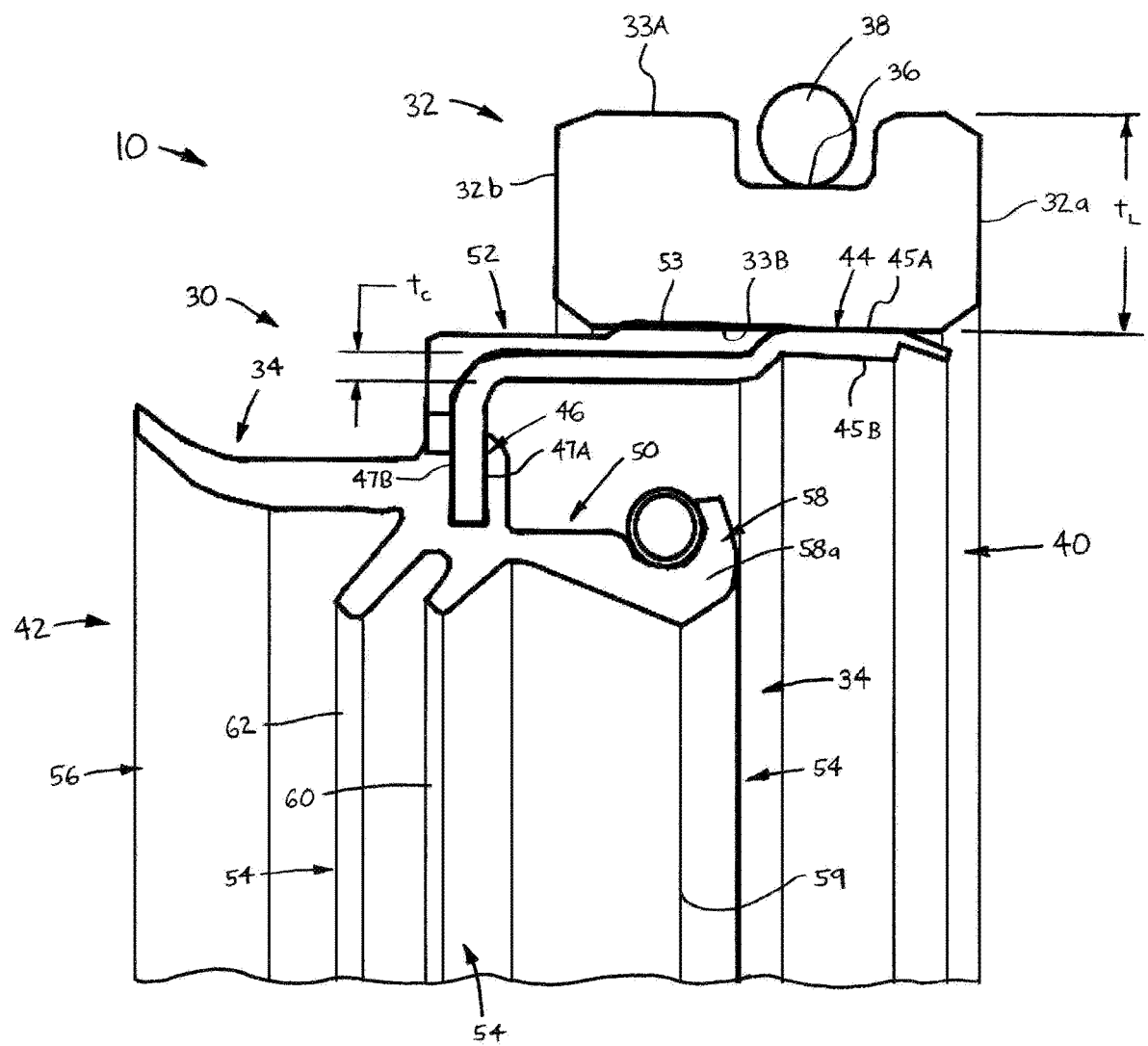
FIG. 4 is a more enlarged, broken-away axial cross-sectional view of an upper portion of the present seal assembly.
Figure 5:
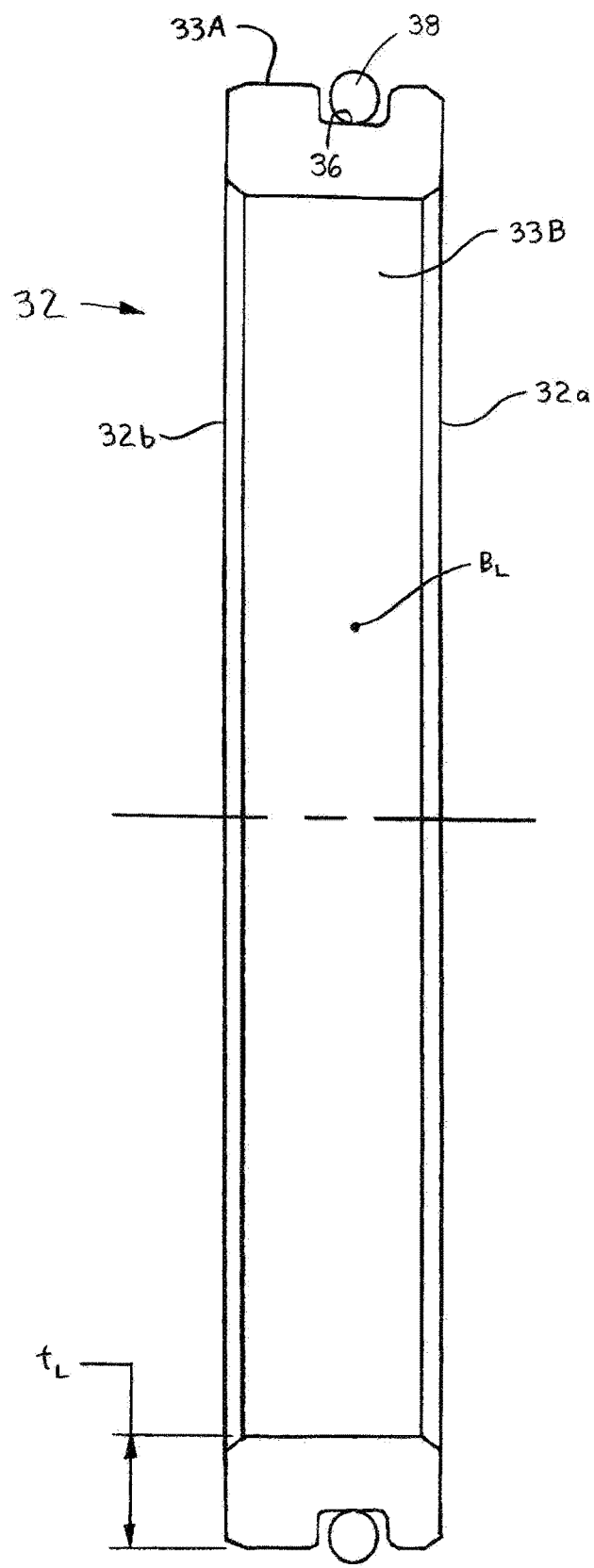
FIG. 5 is an axial cross-sectional view of a load ring of the present seal assembly.

Referring to FIGS. 4 and 5, in order to provide the functionality described above, the load ring 32 is formed of a rigid material, preferably steel, steel alloy or a powered metal, but may be formed of aluminum, a rigid polymeric material or any other appropriate material. Also, the load ring 32 has a substantial radial thickness $t_L$, which is defined between the ring outer and inner circumferential surfaces 33A, 33B. The load ring thickness $t_L$ has a value of at least a substantial portion of the value of the radial thickness $t_R$ (FIG. 2) of the bearing outer ring 22, and preferably the load ring thickness $t_L$ is greater than the bearing ring thickness $t_R$. By being formed of a rigid material with a substantial radial thickness $t_L$, the load ring 32 is capable of being subjected to substantial axial loading or forces without appreciable strain or any distortion (e.g., buckling), such that the bearing outer ring 22 is axially retained or prevented from displacing within the outer member bore $B_O$.

By providing the load ring 32 as described above and in further detail below, the seal 30 is not required to support any loading on the bearing outer ring 22 or to axially retain the ring 22, and as such may be formed with a reduced rigidity or material thickness. More specifically, the rigid annular case 40 of the seal 30 is preferably formed in a stamping process from a blank having a thickness tc, which is bended into an L-shaped case having an axial section 44 and a radial section 46 as described below. As such, the annular case 40 has a more complex shape than the load ring 32, which is generally shaped as a circular cylindrical ring. Due to such complexity, the cost of fabricating the seal case 40 is typically substantially greater than the cost of fabricating the load ring 32, which may be formed as a simple casting, by shearing or cutting from tubular stock metal, etc. Therefore, a reduction in thickness tc of the seal annular case 40, which preferably has a value of at most twenty-five percent (25%) of the value of the thickness ti, of the load ring 32, results in a substantial reduction in the manufacturing cost of the seal assembly 10. Further, as the seal 30 does not support axial loading, there is no requirement to machine off any portion of the sealing member 42 attached to the annular case 40 as discussed above with prior art seal assemblies, therefore eliminating a manufacturing operation with a further corresponding cost decrease. Having described the basic components and functionality above, these and other features of the seal assembly 10 of the present invention are described in further detail below.

Figure 2:
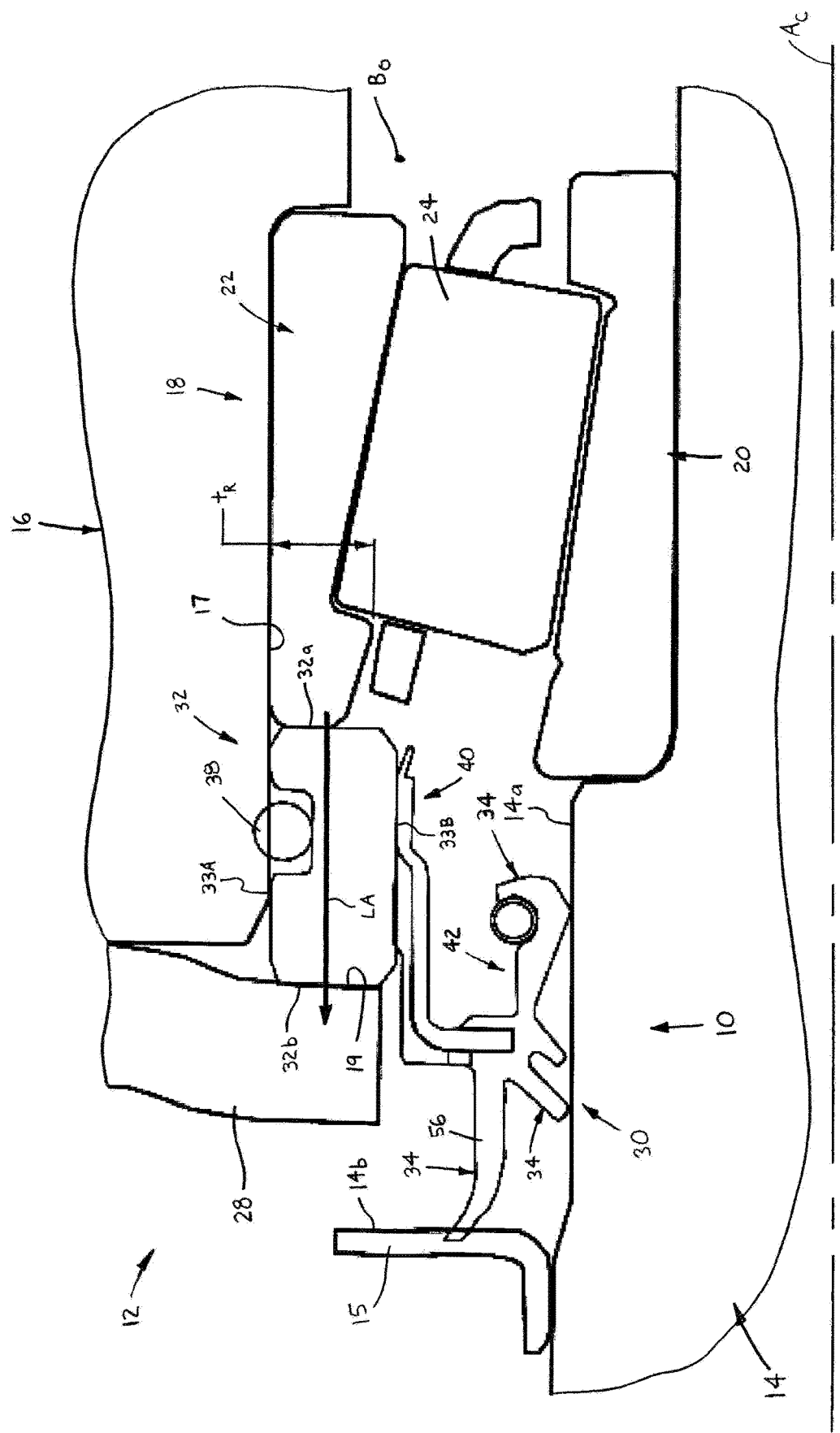
FIG. 2 is an enlarged, broken-away view of a portion of FIG. 1.
Figure 3:
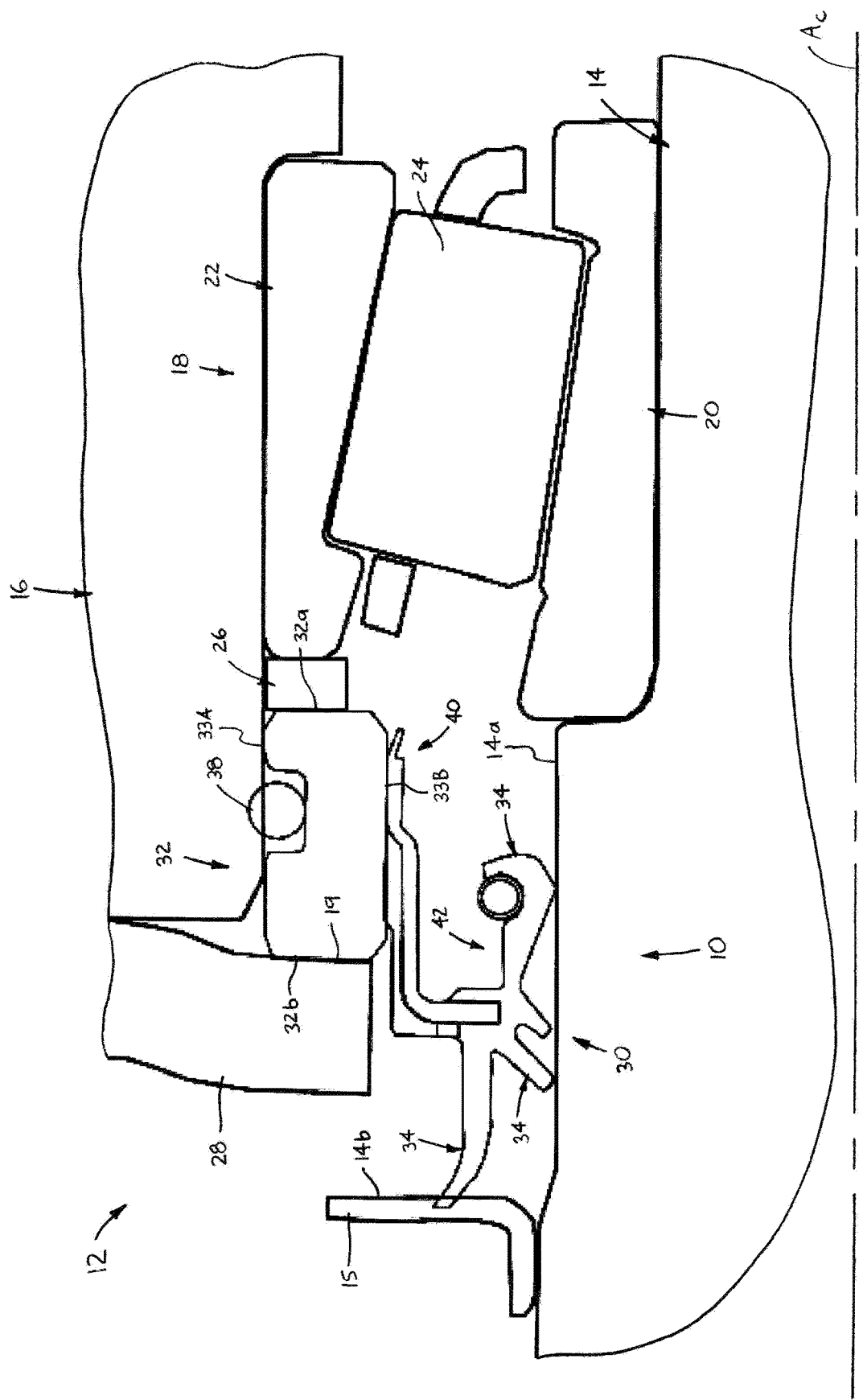
FIG. 3 is an enlarged, broken-away view of an alternative construction of the mechanical assembly including a spacer ring.

Referring now to FIGS. 2, 4 and 5, the load ring 32 is preferably coupled with the outer member 16 by frictional engagement of the outer circumferential surface 33A of the load ring 32 with the inner circumferential surface 17 of the outer member 16. Further, to provide sealing between the load ring 32 and the outer member bore $B_O$, the seal assembly 10 preferably further comprises an outer sealing member 38 disposed between the load ring 32 and the outer member 16. Preferably, the load ring 32 has an annular groove 36 extending radially inwardly from the outer circumferential surface 33A of the load ring 32. Further, the outer sealing member 38 is preferably formed as an annular ring, most preferably an O-ring, disposed at least partially within the groove 36 and compressed between the load ring 32 and the outer member 16.

Figure 6:
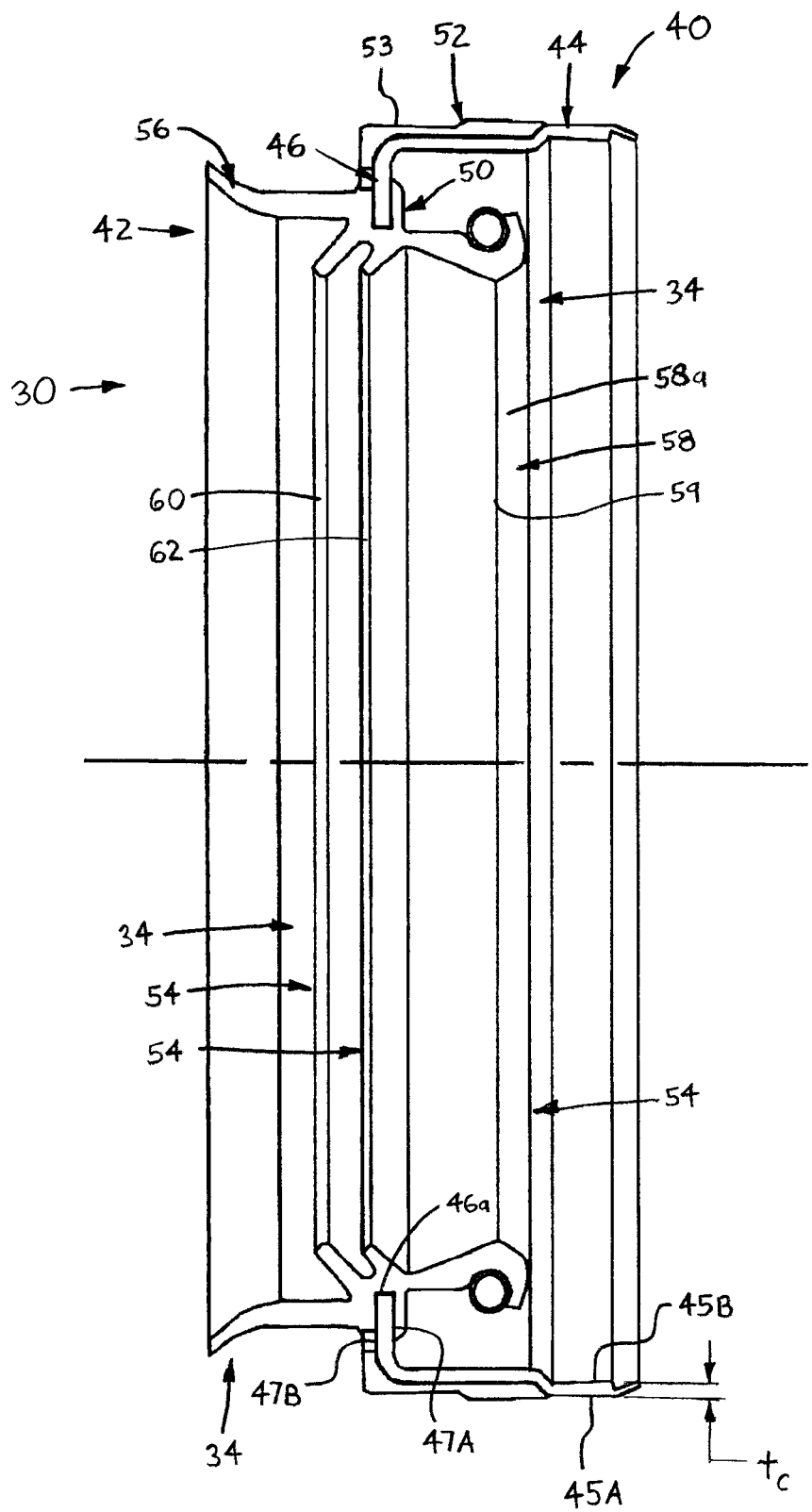
FIG. 6 is an axial cross-sectional view of an exemplary seal of the present seal assembly.

Referring now to FIGS. 2, 4 and 6, the seal 30 is preferably a generally conventional radial lip seal and includes the rigid annular case 40 and the elastomeric sealing member 42 as discussed above. The seal 30 is preferably sized and/or positioned within the load ring 32 such that the seal 30 is axially spaced from, so as to be out of contact with, the bearing outer ring 22 or/and from the outer member radial surface 19. As such, axial loading cannot be transferred through the seal 30, enabling the reduction in the rigidity requirements (and corresponding material reduction) of the seal 30 as discussed above.

More specifically, the axial portion 44 of the annular case 40 has an outer circumferential surface 45A and an inner circumferential surface 45B and the radial portion 46 extends radially inwardly from the axial portion 44 and has opposing first and second radial surfaces 47A, 47B, respectively. Further, the elastomeric sealing member 42 has an inner radial portion 50 molded to the radial portion 46 of the annular case 40 and an outer radial portion 52 molded to the axial portion 44 of the case 40. The outer radial portion 52 has an outer circumferential surface 53 sealingly engageable with the inner circumferential surface 33B of the load ring 32, to both assist in frictionally coupling the seal 30 with the load ring 32 and to provide sealing between the seal 30 and the load ring 32.

Furthermore, the radial inner portion 50 of the sealing member 42 provides the sealing lip(s) 34, which preferably includes a plurality of radial seal lips 54 each sealingly engageable with an outer circumferential surface 14a of the inner member 14 and/or one or more axial sealing lips 56 (one shown) each sealingly engageable with a radial surface 14b of the inner member 14. In a presently preferred embodiment, the radial sealing lips 54 include a primary sealing lip 58 and two secondary or "dust" lips 60, 62. The primary sealing lip 58 extends axially from the first radial surface 47A of the case radial portion 46 and generally toward the bearing 18, and has a tapering axial cross-section such that a sealing surface 59 is provided on a wedge-shaped outer axial end 58a of the lip 58. A central dust lip 60 extends inwardly from an inner radial end 46a of the case radial portion 46 and an outer dust lip 62 extends axially from the second radial surface 47B of the case radial portion 46 in a direction generally away from the bearing 18. Also, one axial sealing lip 56 extends axially from the second radial surface 47B of the case radial portion 46 and sealingly engages with a radial surface 14b of provided on an annular sleeve 15 of the inner member 14.

Although the above-described seal 30 is presently preferred, the seal 30 may be formed in any appropriate manner and may include any number of radial sealing lips 54 and/or any number of axial sealing lips 56, as desired for a particular application. Further, the seal 30 may be formed entirely of an elastomeric material (i.e., a solid sealing ring without a rigid annular case) or formed of another polymeric material (e.g., polyurethane, etc.). The scope of the present invention is in no manner limited to any particular structure or material of the seal 30.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A mechanical assembly comprising:
a bearing, an inner member and an outer member disposed about the inner member, the inner member or the outer member being rotatable about a central axis, the outer member having an inner circumferential surface defining a bore and the bearing having an inner ring coupled with the inner member and an outer ring coupled with the outer member;
an annular seal disposed about the inner member and having a sealing lip sealingly engageable with the inner member;
an annular load ring disposed within the bore of the outer member and having an outer circumferential surface, an inner circumferential surface defining a bore, the seal being disposed within the bore of the load ring so as to be coupled with the load ring, a first axial end disposed against the bearing outer ring or a spacer disposed axially between the load ring and the bearing outer ring, and a second axial end disposed against a radial surface of the outer member, the load ring being configured to support axial loading on the bearing outer ring and to prevent axial displacement of the bearing outer ring; and
a cover plate providing the radial surface of the outer member and disposed against an axial end of the outer member, the second axial end of the load ring being disposed against the cover plate and the load ring being configured to transfer axial loading on the bearing outer ring to the cover plate.

2. The seal assembly as recited in claim 1 wherein the outer circumferential surface of the load ring is frictionally engaged with the inner circumferential surface of the outer member so as to couple the load ring with the outer member.

3. The seal assembly as recited in claim 1 further comprising an outer sealing member disposed between the load ring and the outer member.

4. The seal assembly as recited in claim 3 wherein the load ring has an annular groove extending radially inwardly from the outer circumferential surface of the load ring and the outer sealing member is formed as an annular ring disposed at least partially within the groove and compressed between the load ring and the outer member.

5. The seal assembly as recited in claim 1 wherein the load ring is formed of a rigid material and has a radial thickness defined between the outer and inner circumferential surfaces, the radial thickness of the load ring having a value of at least a substantial portion of a value of a radial thickness of the bearing outer ring.

6. The seal assembly as recited in claim 5 wherein the seal includes a rigid annular case with an outer axial section disposed against the inner circumferential surface of the load ring, the axial section of the annular case having a radial thickness with a value of less than twenty-five percent of the value of the radial thickness of the load ring.

7. The seal assembly as recited in claim 1 wherein the seal is sized and/or positioned within the load ring such that the seal is axially spaced from at least one of the bearing outer ring and the outer member radial surface.

8. The seal assembly as recited in claim 1 wherein the seal includes a rigid annular case and an elastomeric sealing member molded to the rigid annular case and providing the sealing lip.

9. The seal assembly as recited in claim 8 wherein:
the rigid annular case includes an axial portion with an outer circumferential surface and an inner circumferential surface and a radial portion extending radially inwardly from the axial portion; and
the elastomeric sealing member has an inner radial portion molded to the radial portion of the annular case, the inner radial portion providing the sealing lip, and an outer radial portion molded to the axial portion of the case and having an outer circumferential surface sealingly engageable with the inner circumferential surface of the load ring.

10. The seal assembly as recited in claim 1 wherein the seal includes a plurality of radial sealing lips each sealingly engageable with an outer circumferential surface of the inner member and/or one or more axial sealing lips each sealingly engageable with a radial surface of the inner member.

11. A mechanical assembly comprising:
an outer member having an inner circumferential surface defining a bore and a first radial surface extending into the bore;

an inner member disposed within the bore of the outer member so as to define an annular space, the inner member or the outer member being rotatable about a central axis extending through the inner member;
a bearing rotatably coupling the inner member and the outer member and having an inner ring coupled with the inner member and an outer ring coupled with the outer member and disposed against the first radial surface of the outer member; and
a seal assembly for sealing a section of the annular space adjacent to the bearing and including:
an annular seal disposed about the inner member and having a sealing lip sealingly engageable with the inner member; and
an annular load ring disposed within the bore of the outer member and having an outer circumferential surface, an inner circumferential surface defining a bore, the seal being disposed within the bore of the load ring so as to be coupled with the load ring, a first axial end disposed against the bearing outer ring or a spacer disposed axially between the load ring and the bearing outer ring, and a second axial end disposed against a second radial surface of the outer member, the load ring being configured to support axial loading on the bearing outer ring and to retain the bearing outer ring axially between the first radial surface of the outer member and the load ring or the spacer.

12. The mechanical assembly as recited in claim 11 wherein:
the outer member is a housing including a removable cover plate providing the radial surface of the outer member; and
the load ring is disposed axially between the bearing outer ring and the cover plate such that the second axial end of the load ring is disposed against the cover plate, the load ring being configured to transfer axial loading on the bearing outer ring to the cover plate.

13. The mechanical assembly as recited in claim 11 wherein the outer circumferential surface of the load ring is frictionally engaged with the inner circumferential surface of the outer member so as to couple the load ring with the outer member.

14. The seal assembly as recited in claim 11 wherein the load ring has an annular groove extending radially inwardly from the outer circumferential surface of the load ring and the seal assembly further includes an annular seal ring disposed at least partially within the groove of the load ring and compressed between the load ring and the outer member.

15. The seal assembly as recited in claim 11 wherein:
the load ring is formed of a rigid material and has a radial thickness defined between the outer and inner circumferential surfaces, the radial thickness of the load ring having a value of at least a substantial portion of a value of a radial thickness of the bearing outer ring; and
the seal includes a rigid annular case with an outer axial section disposed against the inner circumferential surface of the load ring, the axial section of the annular case having a radial thickness with a value of less than twenty-five percent of the value of the radial thickness of the load ring.

16. The seal assembly as recited in claim 11 wherein the seal is sized and/or positioned within the load ring such that the seal is axially spaced from at least one of the bearing outer ring and the outer member radial surface.

17. The mechanical assembly as recited in claim 11 wherein the seal includes:
a rigid annular case including an axial portion with an outer circumferential surface and an inner circumferential surface and a radial portion extending radially inwardly from the axial portion; and
an elastomeric sealing member molded to the annular case and including an inner radial portion molded to the radial portion of the annular case, the inner radial portion providing the sealing lip, and an outer radial portion molded to the axial portion of the case, the outer radial portion of the seal having an outer circumferential surface sealingly engageable with the inner circumferential surface of the load ring.

18. The seal assembly as recited in claim 17 wherein the inner radial portion of the sealing member includes a plurality of radial seal lips each sealingly engageable with an outer circumferential surface of the inner member and/or one or more axial sealing lips each sealingly engageable with a radial surface of the inner member.

19. A seal assembly for sealing an annular space adjacent to a bearing and defined between an inner member and an outer member disposed about the inner member, the inner member or the outer member being rotatable about a central axis, the outer member having an inner circumferential surface defining a bore and the bearing having an inner ring coupled with the inner member and an outer ring coupled with the outer member, the seal assembly comprising:
an annular seal disposed about the inner member and having a sealing lip sealingly engageable with the inner member; and
an annular load ring disposed within the bore of the outer member and having an outer circumferential surface, an inner circumferential surface defining a bore, the seal being disposed within the bore of the load ring so as to be coupled with the load ring, a first axial end disposed against the bearing outer ring or a spacer disposed axially between the load ring and the bearing outer ring, and a second axial end disposed against a radial surface of the outer member, the load ring being configured to support axial loading on the bearing outer ring and to prevent axial displacement of the bearing outer ring;
wherein the load ring is formed of a rigid material and has a radial thickness defined between the outer and inner circumferential surfaces, the radial thickness of the load ring having a value of at least a substantial portion of a value of a radial thickness of the bearing outer ring, and the seal includes a rigid annular case with an outer axial section disposed against the inner circumferential surface of the load ring, the axial section of the annular case having a radial thickness with a value of less than twenty-five percent of the value of the radial thickness of the load ring.

20. A mechanical assembly comprising:
an outer member having an inner circumferential surface defining a bore;
an inner member disposed within the bore of the outer member so as to define an annular space, the inner member or the outer member being rotatable about a central axis extending through the inner member;
a bearing rotatably coupling the inner member and the outer member and having an inner ring coupled with the inner member and an outer ring coupled with the outer member, the outer ring having a raceway surface facing toward a first axial end of the outer member; and a seal assembly for sealing a section of the annular space adjacent to the bearing and including:
an annular seal disposed about the inner member and having a sealing lip sealingly engageable with the inner member; and
an annular load ring disposed within the bore of the outer member between the bearing outer ring and the first axial end of the outer member, the load ring and having an outer circumferential surface, an inner circumferential surface defining a bore, the seal being disposed within the bore of the load ring so as to be coupled with the load ring, a first axial end disposed against the bearing outer ring or a spacer disposed axially between the load ring and the bearing outer ring, and a second axial end disposed against a radial surface of the outer member, the load ring being configured to support axial loading on the bearing outer ring and to prevent axial displacement of the bearing outer ring.

\* \* \* \* \*